United States Patent
Lloyd et al.

(10) Patent No.: US 8,479,257 B1
(45) Date of Patent: Jul. 2, 2013

(54) METHOD AND APPARATUS FOR ASSESSING POLICY COMPLIANCE OF AS-BUILT DATA NETWORKS

(75) Inventors: Michael A. Lloyd, Belmont, CA (US); Cary D. Jackson, Laguna Hills, CA (US); Ralph T. Brenner, San Francisco, CA (US); Jennifer Gates Durham, Sunnyvale, CA (US)

(73) Assignee: Redseal Networks, Inc., San Mateo, CA (US)

( * ) Notice: Subject to any disclaimer, the term of this patent is extended or adjusted under 35 U.S.C. 154(b) by 725 days.

(21) Appl. No.: 12/537,790

(22) Filed: Aug. 7, 2009

Related U.S. Application Data

(60) Provisional application No. 61/087,355, filed on Aug. 8, 2008.

(51) Int. Cl.
*G06F 17/00* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

2004/0199648 A1* 10/2004 Shelest et al. ................ 709/229

* cited by examiner

*Primary Examiner* — Jacob Lipman
(74) *Attorney, Agent, or Firm* — Kilpatrick Townsend & Stockton LLP; Kenneth R. Allen

(57) ABSTRACT

An as-built network is evaluated by analyzing a model of the network by the steps of determining zones within the network, computing the access between zones, summarizing the access between zones to produce a dataset, then inputting a policy set comprising a collection of approvals, typically in the form of simple white-lists of approvals, then comparing the dataset and particularly the access between zones with the policy set of approvals (white-lists) to determine which access fall outside the approvals, and producing therefrom as an output to an end user a report of compliance and noncompliance, and then repeating the steps of determining, computing, and summarizing, and then the comparing step, after a period or after the network has changed. Thus a network operator or auditor can readily and interactively assess whether the infrastructure is in compliance with regulatory or other design requirements.

18 Claims, 3 Drawing Sheets

METHOD AND APPARATUS FOR ASSESSING POLICY COMPLIANCE OF AS-BUILT DATA NETWORKS

CROSS-REFERENCES TO RELATED APPLICATIONS

The present application claims benefit under 35 USC 119 (e) of U.S. provisional Application No. 61/087,355, filed on Aug. 8, 2008, entitled "Method And Apparatus For Assessing As-Built Networks Using Policy White-Lists," the content of which is incorporated herein by reference in its entirety.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to network security and more particularly to the reconciliation of policy or business objectives with working information technology infrastructure. The invention may be used by any organization, group, business or individual to govern access to data, applications, hosts, data traffic, as well as anomalies, weaknesses and defects of a data network infrastructure. Embodiments of the invention relate specifically to the rules in Section 1 of Payment Card Industry Data Security Standard (PCI DSS) version 1.1, but the principles have broader application than credit card security. PCI DSS is one example of an external regulatory framework that imposes requirements on Information Technology (IT) infrastructure. It is referred to herein as an example of a broad class of similar requirements, externally imposed through regulation or business contract or internally imposed by an organization's own security standards and policies. The subject matter of this invention is a way to meet any requirement to demonstrate that a data network permits or does not permit certain classes of access, or to demonstrate that access control devices (such as firewalls) are deployed and configured along necessary access pathways.

By way of background, the Payment Card Industry Data Security Standard (PCI DSS) comprises guidelines and procedures for the collection, transmittal and storage of credit card information. The Standard contains a great deal of prescriptive detail regarding the structure and implementation of security. Due to complexity of compliance, automation is essential, and network configuration management through firewalls and routers, management policies, and configuration setup and control provide the mechanism for such compliance.

Tools are available for building models of data networks. Such tools are available commercially from the present assignee RedSeal Systems of San Mateo, Calif. and Cisco Systems of San Jose, Calif. It is assumed for this invention that the model of the data network already exists and can be queried to show whether access from any point to any other point is permitted (including details of the protocols and ports that are allowed or blocked). The goal is to compare the data model with a collection of statements ("access specifications") that indicate what should or should not be permitted, and then indicate non-compliance if any access is found that is either undocumented or explicitly forbidden.

There are a variety of statement types that can be applied, including at least the following types:
1. Access matching an access specification is acceptable (white-list rules)
2. Access matching an access specification is not acceptable (negative rules)
3. Access matching an access specification must be present (positive rules)
4. Access matching an access specification is the only permitted access of that type (exclusive rules)
5. Overriding access specifications of any of the prior types. (Strictly, the fifth type, commonly called "exceptions", is a convenience feature, since logically speaking all documentation requirements could be met with the other types. However, in real audit and compliance situations, it is common to write rules of the abstract form "none of the following, except for special case x", or "all of the following, except special cases y and z".)

Prior approaches to the assessment of policy generally lacked either a flexible range of access specifiers or a complete and automated model of the network environment that can provide details of which access is allowed before the user has to specify any rules. An approach which only takes statements from the user first, then tests those statements and only those statements, is not a reliable way to ensure that the whole environment meets the desired objectives. What is needed is a tool that makes it easier for a network operator or an operator to control and evaluate the security of the network and more particularly to verify compliance with network policy standards.

SUMMARY OF THE INVENTION

According to the invention, in a data network infrastructure environment having many potential vulnerabilities to breach, a mechanism or tool is provided whereby a data network can be audited for security. An as-built network is evaluated by analyzing a model of the network by the steps of determining zones within the network, computing the access between zones, summarizing the access between zones to produce a dataset, then inputting a policy set comprising a collection of access specifications combined with a rule type and a documentation of the business purpose for the access, then comparing the dataset and particularly the access between zones with the policy set of access specifications to determine which access either violates a specific rule, or is not accounted for (being outside the set of approvals), and producing therefrom as an output to an end user a report of compliance and non-compliance, and then repeating the steps of determining, computing, and summarizing, and then the comparing step, after a period or after the network has changed. This process is carried out using available tools that can duplicate the data networking environment into a model where tests and analyses can be executed without disrupting the environment that is being modeled. The mechanisms can be used for arbitrarily defined zones and hierarchies of zones for compliance purposes. Thus a network operator or auditor can readily assess whether the infrastructure is in compliance with regulatory or other design requirements, can review the safety and design quality of the infrastructure, and can continuously re-evaluate network compliance based on the recorded policies, rapidly identifying new deviations between the infrastructure and the policy.

Access specifications (hereinafter described) detail the sources, destinations, protocols and ports for a given rule. One non-limiting example might be "all Internet sources, to this web server, using TCP port 80". The rule type can be of several forms. One embodiment uses three rule types—"approved" access, "forbidden" access, and "exceptions", where the first details the business need for a given access specification, the second bans a given access specification, and the third is used as an override if the precedence rules do not give the desired result. (Other embodiments may use ordered lists of two types—permitted and not permitted. Those skilled in the art can identify other schemes for rule types, and the settling of precedence when rules conflict.) The documentation of the business purpose is not restricted, but in some compliance contexts, further restrictions of what is "sufficient" documentation may exist. One non-limiting example might be that a justification must include sign-off from an employee of a given job position or above.

In the specific embodiment of application to the PCI DSS v1.1 standard, no names and meanings are prescribed. Approvals as described herein are "white list" statements, namely a description of some access or a group of access specifications (with user-controllable granularity), and any access found that matches the approval's specification are accepted (from the point of view of the compliance standard). It has been discovered that use of white-list rules provide outcomes that are both adequate for PCI DSS v1.1 compliance and are relatively easily manipulated by a human operator, thereby greatly enhancing policy implementation. In the scope of PCI DSS v1.1 compliance, the user does not need to use Forbidden or Exception rule types, since the class of forbidden traffic is already pre-specified. In other compliance contexts, such as enforcement of an organization's own custom rules, the other rule types may be required.

The invention will be better understood by reference to the following detailed description in connection with accompanying drawings.

DETAILED DESCRIPTION OF THE INVENTION

Figure 1:
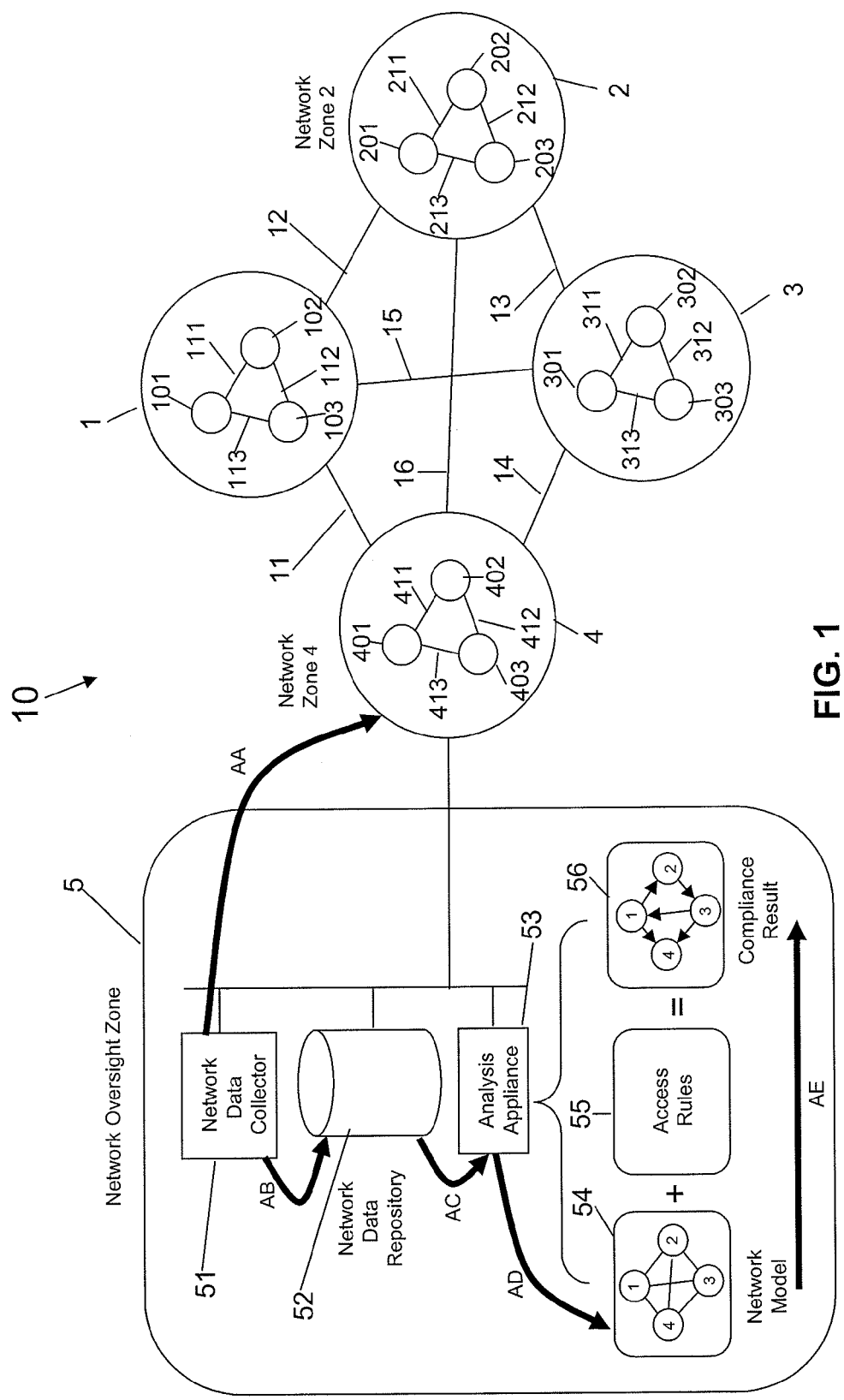
FIG. 1 is a block diagram of a network environment having zones with a network oversight zone according to the invention for analyzing compliance with access rules.

Referring to FIG. 1, a real-world network 10 comprises network zones 1-4 that have access 11-16 therebetween whereby they communicate with one another. Within the network zones there may be a hierarchy comprising subzones 101-103, 201-203, 301-303, 401-403 that have respective access to one another 111-113, 211-213, 311-313, 411-413. This network structure is merely illustrative of one of many network configurations. The network 10 may have hierarchies that may be further nested from the global and regional levels down to the individual node level. Within or adjacent the real network 10 is a network oversight zone 5 in accordance with the invention wherein is found a network data collector 51, a network data repository 52 and a network analysis appliance 53. Functionally, the analysis appliance 53 contains a model 54 of the network 10 (at least of the zones of interest external to the network oversight zone 5), a set of access rules 55 which are configured to be applied to the network model 54 to yield a compliance result 56.

In an overview of operation, the network data collector 51 gathers network configuration data from the network 10 (Step AA), which in turn stores the network configuration data in the network data repository 52 (Step AB). Then the analysis appliance 53 extracts selected data from the repository 52 (Step AC) and creates the network model 54 (Step AD). Thereafter the appliance 53 employs the access rules 55 (from whatever sources) to calculate a compliance result 56 as hereinafter explained.

Figure 2:
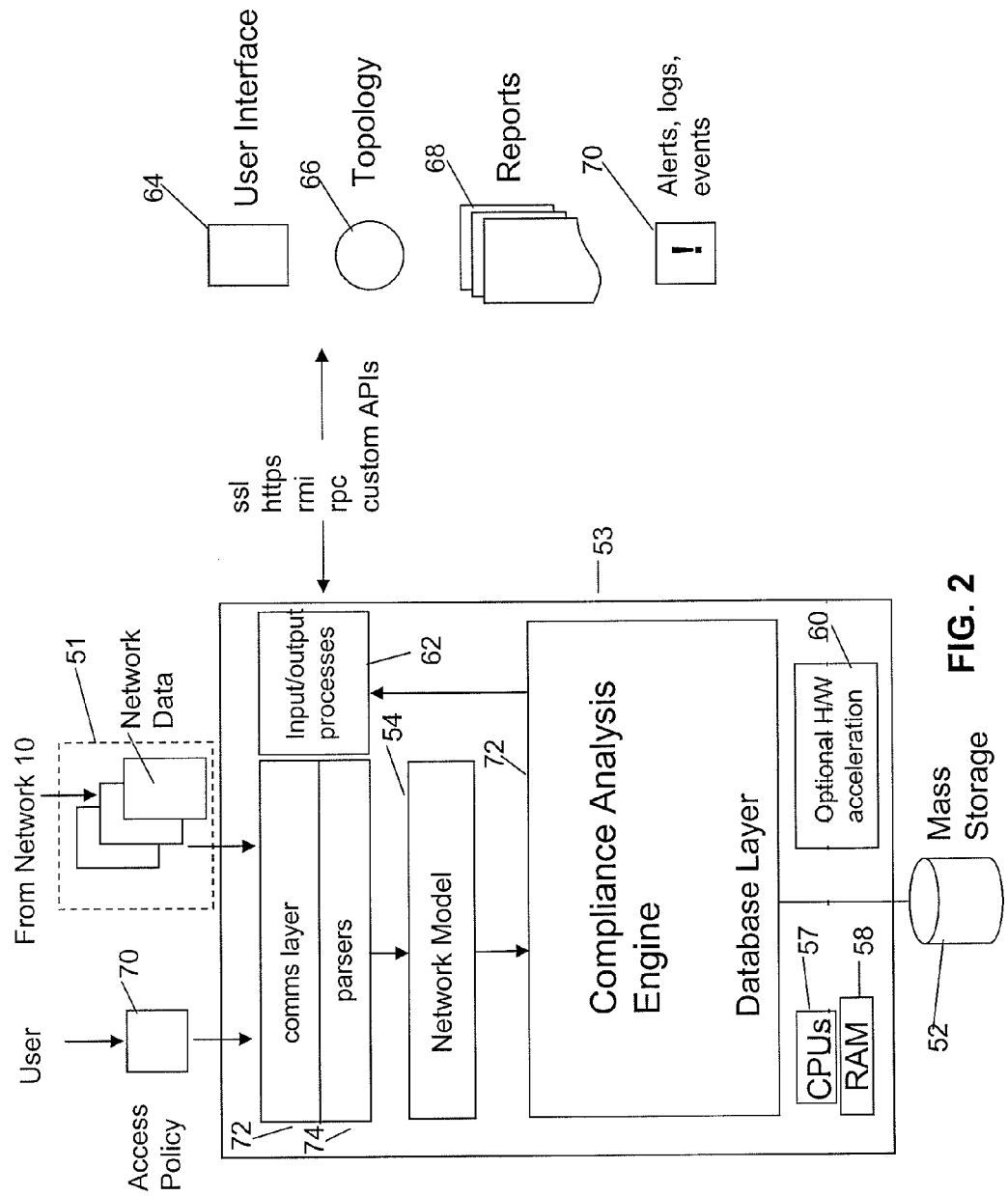
FIG. 2 is a block diagram around an analysis compliance according to the invention.

Referring to FIG. 2, within the network oversight zone 5 is the network appliance 53 having the various support elements of mass storage 52 and the network data collector 51. The appliance includes one or more CPUs and RAM 57, 58 with a suitable suite for an operating system (not shown) embedded in RAM 58, optionally accelerators 60 or like hardware for processing, internal or external mass storage, such as unit 52, and input and output devices, which may include software firewalls and the like, such as, load balancers, caches, proxies, web firewalls, application layer firewalls, and other devices. The input/output devices employ processes 62 according to one or more communication protocols (e.g., ssl, https, rmi, rpc, custom APIs) that provide user interface 64, network topology information 66, report generation 68, and alerts, logs and a record of events of interest 70. The topology is based on that portion of the network cloud of interest, which has devices identified by IP addresses, and which may be configured in IP subnets through routers and the like, as is well understood in the art. The present invention addresses the interface between the content in the network cloud seeking access to resources in the computer system. The user may provide access policy 70 via a communication layer 72 and parsers 74, which along with the network data from component 51 is used to build the network model 54. The network model 54 is then employed as input to a compliance analysis engine 72 having access to a database layer 74 that performs the steps according to the invention as hereinafter explained.

Figure 3:
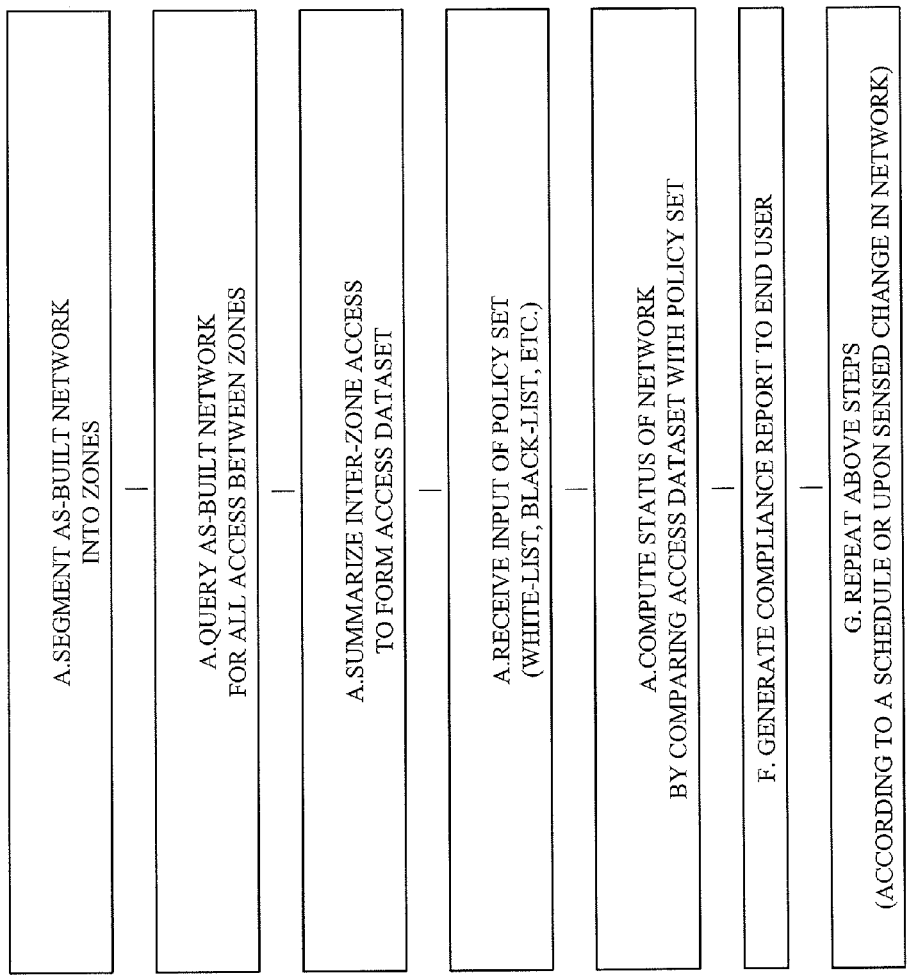
FIG. 3 is a flow chart of the basic process according to the invention.

Referring to FIG. 3, it is a prerequisite that a queryable model 54 of the as-built network 10 be available. Such a commercial model builder is available from RedSeal Systems, as well as other suppliers. This model works from configuration files for network equipment and can compute any traffic access within that network 10.

Given the model 54, the steps for analysis and assessment according to the invention are:

A. Segment the as-built network into Zones (Step A). This may be an automatic process or manual input. Typically, a Zone consists of a collection of IP Subnets in an IP network. It can also consist of a collection of IP endpoints in an IP network, or a mixture of IP endpoints and IP Subnets. In one embodiment, it is also possible to perform "zone inflation", where a list of IP endpoints is used to select the set of surrounding IP Subnets.

B. Find all packet access between Zones by querying the as-built network (Step B). This is an automated step.

C. Summarize the inter-zone packet access from Step B to obtain an access dataset (Step C). Intra-zone access can also be added as a straight-forward extension. A typical summary is a list of the Protocol and Destination Port combinations found in access from one zone to another, directionally. This can be represented graphically. The Protocol/DestPort summary is a preferred mode of operation when the user needs to know which IP protocol types are used in the network.

D. Receive from the user the organization's Policy, that is, its policy set (Step D). The Policy is a first set or collection of Approvals or specifically white-list statements stating, in effect, "this broad or narrow set of access is permissible". In some compliance contexts, this first set may be all that is received. While other policy types are extensions within the broad contemplation of the invention, including negative rules, required rules and exclusive rules, there is an inherent efficiency in use of whitelists. It is a significant simplification in usability of the system in real-world operational situations. If the compliance context requires additional policy types, then one embodiment also receives from the user a second set of Forbidden access specifications, stating "this set of access is never permissible". Within this embodiment, a conflict between a Forbidden rule and an Approval results in the access being forbidden, that is, Forbidden rules take precedence. This embodiment can then be extended to a third set of Exception rules; these have the same effect as Approvals, but they take precedence over Forbidden rules, resulting in a 3-level hierarchy of rules. Other embodiments can follow other schemes for precedence; one non-limiting alternative example would be an ordered list of forbidden and approval statements where the first (or last) match wins.

E. Automatically compute the status of the network—specifically, which access is forbidden by explicit statement from Step D, which access is covered by approvals from Step D, and which access is not accounted for by any statement. This is done by comparing the access dataset with the policy set. Based on this, the whole as-built network can be described as "in compliance" with the policy set so long as all access is deemed approved (and not forbidden or undocumented).

F. Generate a compliance report to the end user for action (Step F). The user, who may be an operator or an auditor may receive the report in some tangible form for use in reporting on compliance or in modifying the approvals. In the specific embodiment adapted to PCI compliance requirements, when the zone structure and approval details are used in a way that matches PCI regulatory requirements, the net result can be used to demonstrate how that the network is in compliance with PCI DSS networking requirements, which is a much sought for feature in real-world operation.

G. The process is repeated (Step G), particularly Steps A, B, and C, presuming that the user/operator has made changes or the network has undergone some reconfiguration through its operation. The steps can also be repeated according to a schedule.

The Steps A-F constitute a one-time compliance assessment—the as-built network is modeled, broken into zones, and analyzed. Any divergence between the owner's policy (Step D) and the zone access discovered (Step C) is automatically highlighted in Step E.

On-going, this procedure can be used to continuously and automatically re-evaluate compliance. For this purpose Steps, A, B, and C are repeated, particularly if network changes. If the user's policy changes, Steps D and E can be re-run to assess whether this change causes a change in compliance. This impacts day to day operations by giving an easy way for a user to track drift between policy and the as-built network. It also greatly impacts workload when trying to meet regulatory requirements: the work to comply the first time is greatly reduced, but the effort savings compound over second and subsequent re-evaluations.

A specific embodiment of the invention is a tool that provides for the governance; approving, monitoring, testing and reporting of a multiplicity of relationships of a data network that includes but is not limited to: access to data, applications, hosts, data traffic, as well as anomalies, weaknesses and defects associated with these. This is achieved by duplicating the data networking environment into a model where tests and analysis can executed without disrupting the environment that is being modeled. The tool includes code for carrying out a multiplicity of processes that collects, analyzes, illustrates, alerts and alarms on user-, compliance-, industry- or system-defined policies.

The model of the data network may be constructed using available commercial tools that operate by obtaining either static and/or dynamic information from user authentication repositories, access logs, firewall, router and switch configurations, hosts, applications, data traffic flow, diagnostic tools, vulnerability assessment systems or databases that are part of the management thereof. The tool provides inference logic that calculates, estimates, and presumes additional model data elements based on the actual model data and user inputs.

The tool may be configured to automatically collect the data from the disparate data sources, including individual network and host devices, databases containing the data, or via manual input methods.

A user interface allows the user to define or use tool supplied templates for compartmentalizing; combining of data and simplifying or organizing the data into zones. These zones can be populated based on any element such as application, asset value, geographic location, data subnet or organizational level as a few examples. When the zone is defined with its data elements all associated data for each of those data elements is also associated to the zone by the tool. Disparate data is organized into zones so that their interrelationship with other zones can be governed.

When two or more zones are defined and their data elements are populated, the tool analyzes the interrelationship of the zones with respect to access to data, applications, hosts, data traffic, as well as anomalies, weaknesses and defects to and from the zones. The zonal interrelationships (inter-zonal access permissions) are generated as illustrations, 5-tuple traffic access diagrams and reports as common forms.

Policy Overlays

Policies describing allowed and prohibited parameters of access to data, applications, hosts, data traffic, as well as anomalies, weaknesses and defects are generated as inter-zonal policy overlays. These policies and their rules may be based on user, compliance, industry or system defined best practice standards. The policy overlay is used to validate the modeled inter-zonal access.

During policy overlay definition, the tool provides a multiplicity of mechanisms for allowing the governance of the policy or its definitions to be approved or denied by system administrators, network managers, executive staff or approval agency as a few examples.

Approval or denial of a policy overlay definition can be regulated by applying these at any level of the policy from inter-zonal access to 5-tuple source and destination IP address information as examples.

The tool compares the inter-zonal policy overlays to the modeled inter-zonal access as a test to validate adherence to a given policy or policies. The tool provides output of the analysis/tests in any form of alert, alarm, illustration, diagram or report.

The tool may be used by any organization, group, business or individual to govern access to data, applications, hosts, data traffic, as well as anomalies, weaknesses and defects of a data network infrastructure.

Any of the data elements in the model including but not limited to the test results, analysis, data collection, intra-zonal access or policies can be formatted as output in any form needed to provide proof or intent of compliance to policies.

The input consists of network infrastructure details, user input and test parameters needed for analysis.

The output of the analysis is in any form of alert, alarm, illustration, diagram or report, to simplify and improve security, adherence to compliance standards and industry best practices.

To implement the tool, a model of the system is built from data from multiple sources, such as configuration files, diagnostic reports, user input, industry standards and compliance requirements. The data portion is organized into logical zones and an overlay policy for flows and access. The interrelationship of those flows and the access between the zones is analyzed to correlate adherence to policy. Policy is allowed to be driven and administrated from any level such as the 5 tuple access between a source and destination or from diagram of the logical zones.

The output provides alarms, alerts, reports and remediation solutions.

The invention is useful to organizations that use a data network and its components for sustaining their business.

Referring to FIG. 3, this diagram, originally in color, is meant as a dashboard, to summarize most of the PCI requirements. (Strictly it only deals with documentation of access and protocols, but this is most of the work in PCI DSS Section 1.) This may be expanded beyond PCI requirements as a basis for more flexible control structures, but for now, something closely based on PCI is provided for illustration purposes. The specifics of the diagram are not intended to in any way limit the scope of the invention. It is however useful to visually summarize the access findings between zones, and the approval process.

Referring specifically to FIG. 3, all the zones should be renameable. The names are herein are PCI names, so cases like "Critical Data" correspond to the more general "Card Holder Data Zone".

The table on the right summarizes what is in each zone. This could be expanded to add more columns, specifically to indicate how much of the space is unscanned, and whether any data is stale. The mark of missing scan data is important for later sections of PCI, beyond the specific compliance requirements of PCI DSS Section 1.

To support the diagram and all the regulation work, the invention defines four variants of "Trusted" internal subnets, and one group of "Untrusted" subnets (including a sub-group of "Internet" connection subnets). The invention is not restricted to this specific count or arrangement; however, this specific set of zones is aligned with PCI DSS Section 1 requirements.

A feature makes it easy to assign any subnet to any of the three Untrusted types (Internet, Extranet and Local) and the four Trusted types. This is similar to an untrusted picker, which can compute candidate untrusted locations based on things like firewall configurations, routing table records, lack of one end of a point-to-point connection, or other indicators that the candidate network location is connected to some wider, untrusted network. One way to generate DMZ "hints" is to run a query to the data model for all access from Untrusted networks to other networks especially to isolate all subnets that flows could land in. A way to generate Critical hints is to use the Card Holder DB folder (described later)—if a host in that folder is in a subnet, that subnet gets a hint for being Critical.

The arrows should only appear in the diagram when analysis shows at least some access. The labels on the arrows count the number of unique protocols referenced in the answer obtained from the network model between the zones. This count is set at ">1000" to handle cases of wide or completely open permissions.

In the context of PCI DSS v1.1 Section 1, the set of Forbidden access is well known—specifically, no access should be open from Untrusted directly into the Critical zone, or vise versa. Thus, in the context of PCI DSS v1.1, the two Forbidden rules can be pre-built into the rule set. In other contexts, users can customize their own Forbidden rules. When any access is found between two zones that is classified Forbidden, the arrow in the appropriate direction between the two zones is drawn in red. Other arrows should be yellow if they carry a requirement for justifications to be provided, and at least some access is not yet approved. If all access is covered by approval, the line goes green. The selection of colors described here, and the precedence rules when more than one color could apply to an arrow, are non-limiting examples, illustrating one preferred embodiment. See below—an approval includes a 5-tuple filter. The unapproved total shown on regulated lines is the number of protocols mentioned in the residue of the network model after the approvals are removed.

Entering Rules

The users are to provide justification and approval of access in their environment. The following table illustrates the form of the rules:

| Traffic to approve | | | |
|---|---|---|---|
| | Source: | Untrusted | ▽ |
| | Destination: | a.b.c.d | ▽ |
| | Service: | http (tcp 80) | ▽ |
| Approved on: | 1/1/09 | | Active: ☑ |
| Approved by: | uiadmin | | |
| Expiration: | Indefinite | | |
| Description: | My web server | | |
| Justification: | | | |

A similar data entry scheme can be used for Forbidden rules and Exceptions, or whatever rule types are available in a given embodiment of the invention. The user can accumulate as many of these rules as necessary, in a global list. The user needs to be able to view the whole list, mark entries inactive and edit entries. (Bulk edits are very desirable—applying a justification, or setting a group as inactive.) Since this is audit data, record keeping is important. In one embodiment, entries can only be deleted if more than 1 year old. If a user edits an entry, the existing one is marked Inactive, and a new active one is created, so we get an audit trail. For inactive entries also track who made it inactive, on what date. (These should be displayed when populated.) The Approved On and Approved By are set automatically. (If users want to record that the approval is on behalf of someone else, they can say so in Justification.)

For specific PCI DSS requirements, summaries are gathered from this global table. For example, the regulations need a list of approved services from one major block to another (Untrust to DMZ). Other compliance contexts may require similar summaries. An option is to allow filters and summaries of the global approval table—a filter for source zone and destination zone, and ideally a mechanism such as a "plus box" expand/contract ("hierarchical table") to show a summary line for one destination protocol, and then expand to the specific approvals including that destination protocol, with their approval details.

The user can edit the service field if needed. In the preferred embodiment, this is a pair of form "protocol port-range", or a set of such pairs. Protocol can be tcp, udp, icmp, a number, or the string "any", or any other scheme for identifying protocol types, while port-range is either a single port number or a range of form "min-max".

In a preferred embodiment, Source and Destination should always be specified as a Zone, and then optionally one or more restrictions to IP endpoints and/or IP subnets. Other embodiments can be used. The reason to encourage specification of zones is partially for user convenience (making it easy to write rules for whole zones at a time), and partially to deal with disambiguation (since in a complex environment, a single IP endpoint may not be unique, but it is much more likely to be unique within a defined zone).

The normal case for population of the Source, Destination and Service fields will depend on the origin, but typically, the Source should enlarge to the major type (e.g., Untrust or DMZ) covering the access details, while Destination and Service should stay specific, unless the user chooses to adjust to different rules.

Setting Rules

The user will sometimes need to hand-edit the rule fields, but the general idea is to try to make it easy to work from a listed discovery of access between groups, down to a summary rule for access of the given type. Specifically, if a user is looking at individual access specifics in the model of the network, it is very detailed—it might appear similar to the following table:
tcp 0.0.0.0-9.255.255.255 0-4443 a.b.c.d 80
tcp 0.0.0.0-9.255.255.255 4445-65535 a.b.c.d 80
and many more similar rows. What this means is the user has set up a web server at a.b.c.d, exposed it to Internet, but also happens to have a general rule banning source port 4444. It is the object to approve this, populating a "best guess" at the intended permissions into the 5-tuple. In general, the "best guess" when approving one row of the data model output is to copy the protocol, destination and port, but replace the source with the major source category—for example, in context of PCI DSS, the major zones are Untrust, DMZ, Critical or General.

Clearly, the user needs to look at some kind of access details to generate these approvals. There is some UI flexibility in how to organize the workflow. One way is to drive from the zone diagram, drilling into any one arrow. An option can have a layer of drilldown that only speaks to the protocols involved, rather than going directly to the full detail of access rows. A layer just showing major areas and service names (e.g., Untrust to DMZ, tcp 80) matches the high level diagram, and with allowed approval from that layer, although the approvals are fairly wide. It should be possible to drill down further, to full access details. As noted, rules can be driven from single lines of full access, but the user will normally end up generating a much more general approval than the specific access line content.

In either kind of drilldown (type pairs with protocols or full access), which lines are already approved must be clearly marked, and which are not. We also need to be able to show the rule covering a line that is already entered. (If a detailed access is partially covered by an approval, it is considered NOT approved. For a summary such as "Untrust to DMZ, tcp 80" to be approved, all the actual access components beneath the summary need to be approved.) At least in the larger access tables, it would be desirable to support a mode that only displays unapproved access, rather than all, since over time, the unapproved list should get small.

When new approvals are added, an option is to redisplay the high level diagram, the totals, and the details of which access is approved and which is not. In one embodiment, the user can use a Refresh button, at least on the top diagram, and possibly also offered on drill-downs.

Card Holder DB Folder

One specific PCI DSS v1.1 regulation requires a Zone containing card holder databases. This zone can be populated manually from an external list of IP endpoints, when available. However, sometimes this information is not readily available, or an auditor may wish to check for any other likely candidates that have been omitted from the claimed list of cardholder servers. In such situations, it is possible to suggest likely candidate servers based on information on hosts. The most reliable information comes from commercial products which can scan hosts, locate databases, then query the database content to identify data structures that appear to be in scope (for example, in PCI DSS v1.1, database fields of the appropriate sizes to record cardholder information). If this is not available, another replacement is host inventory information, either from a commercial asset management system, commercial patch management systems, or commercial vulnerability scanners. All of these systems can identify hosts and the applications they are running, and so can their data can be interrogated to locate database software. In one embodiment, this can be presented as a candidate set of machines which may be in the Cardholder Data Zone. Further extensions are possible, such as providing a limiting range within the network that will be analyzed to look for candidates.

"Find the Firewall" Feature

The description so far has dealt with access assessment. However, there is a related type of network compliance testing which is also contemplated as within the scope of this invention. Specifically, rather than evaluating a statement of the form "is the access from Zone A to Zone B justified?", the related statement is "does all traffic from Zone A to Zone B pass through a mandated control device?" This requirement arises in many compliance contexts, including (but not limited to) PCI DSS v1.1 Section 1. The specific control device type can vary, including at least stateful firewalls, load balancers, caches, proxies, web firewalls, application layer firewalls, and other devices. Also, once identified, the control device or devices between a given zone pair can be scrutinized further for configuration details, such as enablement of specific features (for example, anti-spoof filtering). For this description, the PCI DSS v1.1 Section 1 requirement is used as a non-limiting example. PCI DSS v1.1 Regulations 1.1.3, 1.3.2, 1.3.3 and 1.3.8 all require the location of some firewalls for a specific test.

1.1.3 requires finding firewalls "for each Internet connection", and "between any DMZ and the internal network zone". This should fail if there is a path from the network cloud of the Internet to anywhere, or DMZ to anywhere internal, where no firewall is found.

1.3.2 requires a test for anti-spoofing from Internet to DMZ. To do this, it is necessary to check the configurations of the firewalls found in the previous step.

1.3.3 just requires that "stateful inspection" be used from outside to inside, which is effectively the same as the 1.1.3 requirement for firewalls between Internet and inside.

1.3.8 requires firewalls between wireless networks and the Critical zone (with approvals for the necessary traffic).

In summary, it must be proven that there are firewalls from Internet to Internal, Internet to DMZ, DMZ to all non-DMZ Internal, and Wireless to Critical. This is one non-limiting example of the kinds of control point tests that can be required in various policy contexts.

For the search for any pair, use a 2-phase algorithm, running on the network graph structure that is a necessary part of the data model described earlier:

Phase 1, start from origin set (Internet, say), grow the set outwards, stop at firewalls. If any of the target set are found, flag a failure.

Phase 2, iterate thru firewalls from phase 1, grow outwards from each. (Don't revisit any phase 1 space.) Stop as soon as any members of target set are found. That makes this firewall a member of the interesting set.

Note that this algorithm does not consider routing or filtering, but one skilled in the art could generalize it to do so.

The firewalls found between the zone pair are listed. Also, any failures found in phase 1 are also listed, indicating the source point and destination point that were connected by at least one path not passing through a requisite control point.

The listed firewalls can then also be tested for further rules. For example, in PCI DSS v1.1, requirement 1.3.2 requires verification of anti-spoofing for the class of firewalls found between Internet and internal locations.

Reporting:

Attached hereto as a Patent Appendix a detailed description of the calculation of a compliance report for a specific embodiment of the invention, namely a report under PCI DSS Section 1, as hereinabove referenced. The Patent Appendix also incorporates a detailed description of the development specification for a tool according to the invention. This document provides one of ordinary skill in the art sufficient guidance to replicate a specific embodiment of the invention.

The invention has been explained with reference to specific embodiments. Other embodiments will be apparent to those of ordinary skill in the art. It is therefore not intended that the invention be limited, except as indicated by the claims.

PATENT APPENDIX
The calculation of a compliance report

Table of Contents

| | |
|---|---|
| Summary | 18 |
| PCI report | 18 |
|     Summary Page | 19 |
|     Requirements Section | 20 |
|     Requirement rules in detail | 20 |
|     Appendices | 24 |
|         Appendix 1 – Process Description | 24 |
|         Appendix 2 – Topology Diagram | 24 |
|         Appendix 3 – Firewall Requirements | 24 |
|         Appendix 4 – Roles and Responsibilities | 25 |
|         Appendix 5 – Summary of Approved Services | 25 |
|         Appendix 6 – Details of Approvals | 26 |
|         Appendix 7 – Protocols with No Documentation | 26 |
|         Appendix 8 – Configuration Standards | 26 |
|         Appendix 9 – Unapproved Access | 26 |
|         Appendix 10 – Flows to and from Internet not routed to DMZ | 27 |
|         Appendix 11 – Database locations | 27 |
|         Appendix 12 – Locations with outbound connectivity | 27 |
|         Appendix 13 – Outbound traffic from payment card applications | 27 |
|         Appendix 14 – Externally accessible servers | 27 |
| Overview | 28 |
|     Define Zones in the network | 28 |
|         Untrusted | 28 |
|         DMZ 28 | |
|         Cardholder Data Evnironment (Critical Zone) | 29 |
|         General Zone | 29 |
|         Wireless Subnets | 29 |
|         Other Zones | 29 |
|     Identify flows between Zones | 30 |
|         Documenting Rules for Access | 30 |
|         Prohibited flows | 31 |
|         Approve flows | 31 |
|             Flow summaries | 32 |
|     Find Firewalls between Zones | 32 |
|     Access between Zones | 33 |
|         Zones and Compliance | 34 |
|         Access Specification | 34 |
|         Traffic Flow Compliance with Access Specifications | 34 |
|         Access Details | 35 |
|             Define Zones | 35 |
|     Compliance Summary Graphic | 36 |

Summary
The invention can be used to calculate and track compliance with many kinds of network access policies. One specific instantiation is testing compliance with the requirements of the Payment Card Industry (PCI) Data Security Standard (DSS), specifically the network related issues in Section 1. This section shows how to compute a compliance report for PCI DSS Section 1. The method used here can be generalized to cover other compliance criteria with application beyond PCI DSS.

PCI REPORT

This report has three major sections: overall status, line by line status, and a collection of appendices. The overall and line by line status shows whether the user passes or fails each requirement in PCI Section 1, and the appendices provide the details.

The status page shows the zone diagram, summary status of how many regulations are passed, how many are failed, plus a (fixed) list of items the user must provide.

The line by line status section is laid out using the look and feel of a PCI DSS compliance report.

A sample of the first page of Section 1:

| PCI DSS REQUIREMENTS | TESTING PROCEDURES | IN PLACE | NOT IN PLACE | TARGET DATE/ COMMENTS |
|---|---|---|---|---|
| 1.1 Establish firewall configuration standards that include the following: | 1.1 Obtain and inspect the firewall configuration standards and other documentation specified below to verify that standards are complete. Complete each item in this section | | | |
| 1.1.1 A formal process for approving and testing all external network connections and changes to the firewall configuration | 1.1.1 Verify that firewall configuration standards include a formal process for all firewall changes, including testing and management approval of all changes to external connections and firewall configuration | | | |
| 1.1.2 A current network diagram with all connections to cardholder data, including any wireless networks | 1.1.2.a Verify that a current network diagram exists and verify that it documents all connections to cardholder data, including any wireless networks | | | |
| | 1.1.2.b. Verify that the diagram is kept current | | | |
| 1.1.3 Requirements for a firewall at each Internet connection and between any demilitarized zone (DMZ) and the internal network zone | 1.1.3 Verify that firewall configuration standards include requirements for a firewall at each Internet connection and between any DMZ and the Intranet. Verify that the current network diagram is consistent with the firewall configuration standards. | | | |
| 1.1.4 Description of groups, roles, and responsibilities for logical management of network components | 1.1.4 Verify that firewall configuration standards include a description of groups, roles, and responsibilities for logical management of network components | | | |
| 1.1.5 Documented list of services and ports necessary for business | 1.1.5 Verify that firewall configuration standards include a documented list of services/ports necessary for business | | | |
| 1.1.6 Justification and documentation for any available protocols besides hypertext transfer protocol (HTTP), and secure sockets layer (SSL), secure shell (SSH), and virtual private network (VPN) | 1.1.6 Verify that firewall configuration standards include justification and documentation for any available protocols besides HTTP and SSL, SSH, and VPN | | | |
| 1.1.7 Justification and documentation for any risky protocols allowed (for example, file transfer protocol (FTP), which includes reason for use of protocol and security features implemented | 1.1.7.a Verify that firewall configuration standards include justification and documentation for any risky protocols allowed (for example, FTP), which includes reason for use of protocol, and security features implemented | | | |
| | 1.1.7.b Examine documentation and settings for each service in use to obtain evidence that the service is necessary and secured | | | |

The Testing Procedures column and the Date/Comments column are not needed in the compliance report described here, but could be provided. See below for the entry by entry content.

The appendices come after all the Section 1 items.

SUMMARY PAGE

The layout described here is one of many possible approaches to layout of the data.

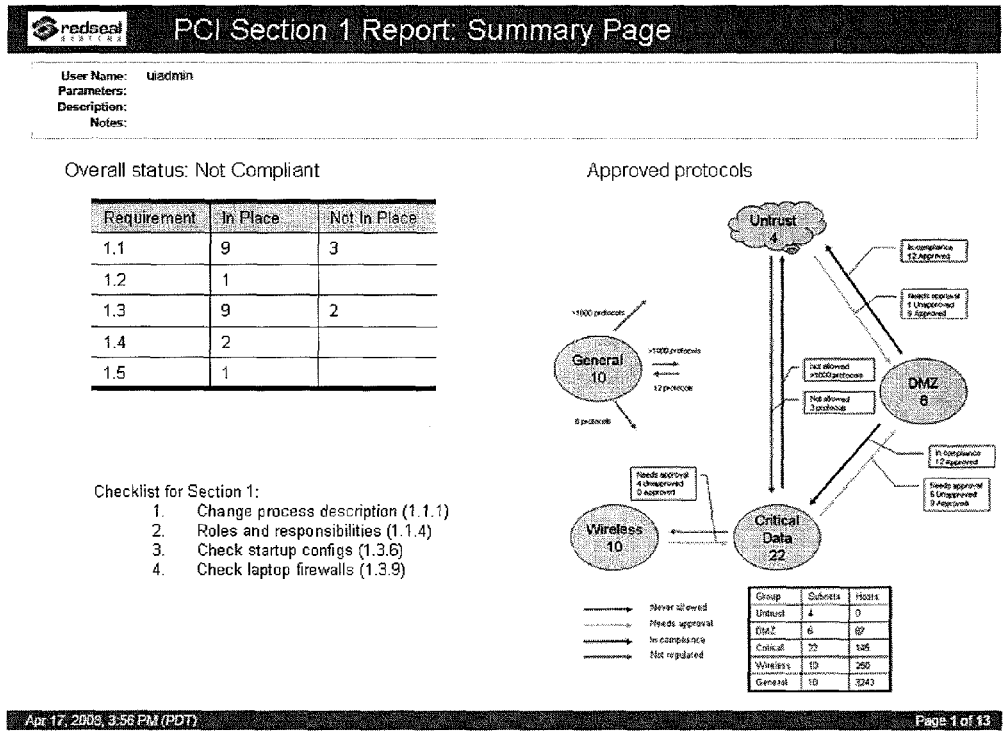

The overall status is Not Compliant as long as Not In Place is above zero for any row.

Note that a single requirement can be both In Place and Not In Place if only part of it is done. In Place is the total of requirements that have at least something to say in the column. Not In Place is the total that have something in that column (see next section).

The text about the checklist is static, indicating content required for compliance (not applicable to the invention described here).

REQUIREMENTS SECTION

| PCI Section 1 Report: Requirements ||| 
| --- | --- | --- |
| PCI DSS Requirements | In Place | Not In Place |
| 1.1 Establish firewall configuration standards that include the following: | | |
| 1.1.1 A formal process for approving and testing all external network connections and changes to the firewall configuration | Appendix 1 – Process Description | |
| 1.1.2 A current network diagram with all connections to cardholder data, including any wireless networks | Appendix 2 – Topology Diagram | |
| 1.1.3 Requirements for a firewall at each Internet connection and between any demilitarized zone (DMZ) and the internal network zone | Appendix 3 – Firewall Requirements<br>3 Internet connections firewalled<br>18 DMZ subnets firewalled | Appendix 3 – Firewall Requirements<br>1 Internet connection not firewalled |
| 1.1.4 Description of groups, roles, and responsibilities for logical management of network components | Appendix 4 – Roles and Responsibilities | |
| 1.1.5 Documented list of services and ports necessary for business | Appendix 5 – Summary of Approved Services<br>16 Approved Services | |
| 1.1.6 Justification and documentation for any available protocols besides hypertext transfer protocol (HTTP), and secure sockets layer (SSL), secure shell (SSH), and virtual private network (VPN) | Appendix 6 – Detailed Approvals<br>1,320 Approved Flows | Appendix 9 – Unapproved Services<br>14 Unapproved Flows |

REQUIREMENT RULES IN DETAIL

This section goes through each requirement, specifying what to put in In Place and Not In Place.

1.1 Establish firewall configuration standards that include the following:

Grey cells.

1.1.1 A formal process for approving and testing all external network connections and changes to the firewall configuration In Place is always "Appendix 1 – Process Description"; Not In Place is blank

1.1.2 A current network diagram with all connections to cardholder data, including any wireless networks In Place is "Appendix 2 – Topology Diagram"

1.1.3 Requirements for a firewall at each Internet connection and between any demilitarized zone (DMZ) and the internal network zone This is based on the algorithm to locate firewalls in particular spots.

If either cell has content, the first line is "Appendix 3 – Firewall Requirements, sections 3.1-3.2"

In Place has a line "X Internet connections firewalled" if X > 0, and "Y DMZ subnets firewalled" if Y > 0.

Not In Place has "X Internet connections not firewalled" if X > 0, and "Y DMZ subnets not firewalled" if Y > 0

1.1.4 Description of groups, roles, and responsibilities for logical management of network components In Place always says "Appendix 4 – Roles and Responsibilities"

1.1.5 Documented list of services and ports necessary for business

In Place always starts "Appendix 5 – Summary of Approved Services", and then has a line "X Approved Services"

Note that X is not the number of approvals – it is the number of unique services found that are covered by an approval. (That is, it's the total of unique proto/port pairs.) Note also that this reg never "fails" – it just shows what has been documented. Later regs fail if, for example, nothing has been entered.

1.1.6 Justification and documentation for any available protocols besides hypertext transfer protocol (HTTP), and secure sockets layer (SSL), secure shell (SSH), and virtual private network (VPN)

In Place starts "Appendix 6 – Details of Approvals", unless there are no approvals entered at all. Then "X justifications recorded", where X is the number of approvals in the system.

Not In Place is based on the number of unapproved access protocol/ports (as computed by the algorithm described in this invention). If the number is zero, Not In Place should be blank. Take the total of access protocol/ports, and subtract any matching the 4 called out (http, ssl, ssh, vpn). If the total unapproved, not counting the allowed, is >0 the total should be displayed here. When this is non-blank, it's two lines, the first reading "Appendix 7 – Protocols with No Documentation", and the second in the form "X protocols are unapproved"

1.1.7 Justification and documentation for any risky protocols allowed (for example, file transfer protocol (FTP), which includes reason for use of protocol and security features implemented Identical answers to 1.1.6. Note that this means effectively counting all protocols other than the 4 OK as "risky".

1.1.8 Quarterly review of firewall and router rule sets

In Place should say "Automated network analysis used at least quarterly to identify firewall and router issues"

1.1.9 Configuration standards for routers.

In Place always says "Appendix 8 – Configuration Standards"

1.2 Build a firewall configuration that denies all traffic from "untrusted" networks and hosts, except for protocols necessary for the cardholder data environment.

In Place counts the num approvals from Untrust to anywhere (nb: not all approvals). If >0, "Appendix 6 – Details of Approvals, sections 6.1 – 6.2", and "X approved protocols"

Not In Place counts the number of flows (not approvals) in the Untrusted sections of Appendix 9. If > 0, "Appendix 9 – Unapproved flows, sections 9.1 – 9.2", and "X unapproved flows"

1.3 Build a firewall configuration that restricts connections between publicly accessible servers and any system component storing cardholder data, including any connections from wireless networks. This firewall configuration should include the following:

Gray cells

1.3.1 Restricting inbound Internet traffic to Internet protocol (IP) addresses within the DMZ (ingress filters)

Count the num access protocol/ports (not approvals) from Internet to Cardholder, plus Internet to General. If the num flows is zero, In Place should say "Appendix 10 – Access Paths from Internet arriving outside DMZ, section 10.1" and "No access found". If it's not zero, In Place should be blank, and Not In Place should say "Appendix 10 – Access Paths from Internet arriving outside DMZ, section 10.1" and "X protocols found"

1.3.2 Not allowing internal addresses to pass from the Internet into the DMZ If any firewalls in Appendix 3.1 passed the anti-spoofing test, In Place should say "Appendix 3, section 3.1" and "X Internet firewalls have anti-spoofing". If any failed, Not In Place should say "Appendix 3, section 3.1" and "Y Internet firewalls do not have anti-spoofing enabled".

1.3.3 Implementing stateful inspection, also known as dynamic packet filtering (that is, only "established" connections are allowed into the network)

If either cell has content, the first line is "Appendix 3 – Firewall Requirements, section 3.1"

In Place has a line "X Internet connections firewalled" if X > 0

Not In Place has "X Internet connections not firewalled" if X > 0

1.3.4 Placing the database in an internal network zone, segregated from the DMZ If any servers in the Cardholder Data Server folder are in Cardholder subnets, In Place says "Appendix 11 – Database locations", and "X databases are in the Cardholder zone". If any are not in Cardholder subnets, Not In Place says "Appendix 11 – Database locations", and "Y databases are not in the Cardholder zone"

1.3.5 Restricting inbound and outbound traffic to that which is necessary for the cardholder data environment If there are any approvals into or out of Cardholder zone, then In Place should say "Appendix 6 – Details of Approvals", and "X approvals into Cardholder Zone" and "Y approvals out of Cardholder Zone".

If there are any unapproved access protocol/ports into or out, then Not In Place should say "Appendix 9 – Unapproved Access" and "X unapproved access protocols into Cardholder Data Zone" and "Y unapproved access protocols out of Cardholder Data Zone"

1.3.6 Securing and synchronizing router configuration files. For example, running configuration files (for normal functioning of the routers), and start-up configuration files (when machines are re-booted) should have the same secure configuration Leave both In Place and Not In Place blank

1.3.7 Denying all other inbound and outbound traffic not specifically allowed

Identical answer to 1.3.5

1.3.8 Installing perimeter firewalls between any wireless networks and the cardholder data environment, and configuring these firewalls to deny any traffic from the wireless environment or from controlling any traffic (if such traffic is necessary for business purposes)

If there are any wireless firewalls, In Place should say "Appendix 3 – Firewall Requirements, section 3.3" and "X wireless subnets are firewalled". If there are any approvals for Wireless -> Cardholder, then In Place should also say "Appendix 6 – Details of Approvals" and "Y approvals recorded".

If there are any wireless subnets that do not have a firewall, Not In Place should say "Appendix 3 – Firewall Requirements, section 3.3" and "X wireless subnets not firewalled". If there are any unapproved flows for Wireless -> Cardholder, then Not In Place should also say "Appendix 9 – Unapproved Access Protocols", and "Y access protocols unapproved".

1.3.9 Installing personal firewall software on any mobile and employee-owned computers with direct connectivity to the Internet (for example, laptops used by employees), which are used to access the organization's network.

In Place should say "Appendix 12 – Locations with outbound connectivity" and "X subnets identified"

1.4 Prohibit direct public access between external networks and any system component that stores cardholder data (for example, databases, logs, trace files).

Grey cells.

1.4.1 Implement a DMZ to filter and screen all traffic and to prohibit direct routes for inbound and outbound Internet traffic If there are any access protocol/ports from Internet to Cardholder, or Cardholder to Internet (regardless of approval), then In Place should be blank. If the total is zero, then In Place should say "Appendix 10 – Access to and from Internet not routed to DMZ" and "0 flows found"

If there are access protocol/ports, Not In Place should say "Appendix 10 – Access to and from Internet not routed to DMZ" and "X flows identified"

1.4.2 Restrict outbound traffic from payment card applications to IP addresses within the DMZ.

Count open access from Cardholder Servers Folder (nb: not Cardholder subnets), tallying up those that land in DMZ and those that land elsewhere.

In Place should say "Appendix 13 – Outbound access from payment card applications" and "X access protocols to DMZ" (unless X is 0, in which case In Place is blank). Not In Place is blank unless there is access outside DMZ, and it then says "Appendix 13 – Outbound access from payment card applications" and "Y access protocols not to DMZ"

1.5 Implement IP masquerading to prevent internal addresses from being translated and revealed on the Internet. Use technologies that implement RFC 1918 address space, such as port address translation (PAT) or network address translation (NAT).

Count servers in DMZ with and without RFC 1918 addresses.

In Place should say "Appendix 14 – Externally accessible servers" and "X servers found with RFC 1918 addresses" (unless X is 0, in which case In Place is blank). Not In Place is blank unless there are some non-1918, in which case "Appendix 14 – Externally accessible servers" and "Y servers found with public addresses"

APPENDICES

Each appendix starts on a new page.

Appendix 1 – Process Description

Generate a page saying "Please attach a description of your process for approving, testing and changing firewalls and external connections"

Appendix 2 – Topology Diagram

This is a full page version of the network topology.

Appendix 3 – Firewall Requirements

Section 3.1

A table with 3 columns. First is each subnet of type Internet; second names a firewall connected to it (provided by the algorithm described in this invention). If the algorithm returns more than 1 firewall, repeat the Internet subnet on another line, 1 per firewall. If no firewall found, say "Not firewalled". Third column shows whether or not the firewall passed the NCC for anti-spoofing – either "Has anti-spoofing" or "No anti-spoofing found"

Section 3.2

A table of all firewalls found between DMZ and internal space (nb: not a list pairing DMZ subnets with specific firewalls).

Section 3.3

Similar to 3.1, a list of Wireless subnets with the firewall(s) between it and Cardholder space.

For 3.1 and 3.3, some firewalls may be mentioned several times. Also, some subnets may fail the test, missing a firewall – in this case, put "Not firewalled" in place of the firewall name.

Appendix 4 – Roles and Responsibilities

A page saying "Please attach a description of groups, roles, and responsibilities for logical management of network components."

Appendix 5 – Summary of Approved Services

This and several later appendices have sub-sections for zone pairs. There are 12 "main" pairs (4 main zones to each of 3 other main zones), plus two for wireless. The suggested order is:
1. Untrusted -> DMZ
2. Untrusted -> Cardholder
3. Untrusted -> General
4. DMZ -> Untrusted
5. DMZ -> Cardholder
6. DMZ -> General
7. Cardholder -> Untrusted
8. Cardholder -> DMZ
9. Cardholder -> General
10. General -> Untrusted
11. General -> DMZ
12. General -> Cardholder
13. Wireless -> Cardholder
14. Cardholder -> Wireless In appendix 5 is a list showing in each case the set of Services that have been used in approvals for that pair. So for example:

Section 5.1: 2 Approved Services from Untrusted to DMZ
    Service          Number of approved flows
    Tcp 80 http     2
    Tcp 22 ssh      4

If a given section has no approved access protocols, it should still appear, and say so, so that sub-sections have constant numbering.

Note that approvals can use custom sets of protocols. Any cases of that get their own row here, even if they overlap with other cases (eg, a rule about 80,443 is displayed on a different line from a rule about 80).

Appendix 6 – Details of Approvals 14 sections for each zone pair, starting with Untrusted to each zone (so 6.1 is Untrust->DMZ, and 6.2 is Untrust->Cardholder)

Similar to Appendix 5, but expanding the actual approval rules and reasons. These are groups of the approvals by Service. For example:
Appendix 6.1: 19 Approvals from Untrusted to DMZ
Service: http      Approvals: 6

| Date | By | Reason | Details |
|---|---|---|---|
| 1/1/08 | Jim | Web is wonderful | Src=Internet, dst=10.42.19.76 |
| 1/1/08 | Bob | It is? | Src=<subnet list>, dst=<subnet list> |
| ... | ... | ... | ... |

Protocol: ssh    Approved Flows: 5

| Date | By | Reason | Details |
|---|---|---|---|
| 1/1/08 | Jim | The show must go on | Src=<list of mgmt subnets>, dst=DMZ |
| ... | ... | ... | ... |

Appendix 7 – Protocols with No Documentation

Table listing all protocols without approvals between any zones. One column details the service, one lists the zone pair (if there's more than one, use separate lines), and one shows whether the flow is allowed under requirement 1.1.6. For example:

| Service | Zones | Acceptable under 1.1.6 |
|---|---|---|
| tcp 80 http | General -> DMZ | Yes |
| tcp 25 smtp | Internet -> DMZ | No |

Appendix 8 – Configuration Standards

List of applied device configuration rules that are NOT suppressed.

Appendix 9 – Unapproved Access

Sections for all 14 zone pairs, starting with 9.1 Untrust->DMZ and 9.2 Untrust->Cardholder.
List access protocol/ports found with the same 5 columns as NPE – protocol, src IP, src port, dest IP, dest port.
Note that some access entries can occur more than once, since Wireless isn't a full "subnet type". So an access specification is in section X, about zone A to zone B, if the source is in A and the dest is in B, even if this means the access specification shows up more than once.

Appendix 10 – Flows to and from Internet not routed to DMZ

Section 10.1 shows Internet access to non-DMZ locations (full NPE). Section 10.2 shows access from non-DMZ locations to Internet (full NPE). If either is blank, say "No access found."

Appendix 11 – Database locations

List all servers in the Cardholder Data Server folder, and list the subnet type of the containing subnet in a second column. Sort by Zone first (descending from Z, so all Cardholder entries are together and after any non-Cardholder), and then sort by first column. For example:

| Cardholder Data Server | Zone |
|---|---|
| 10.11.12.13 | DMZ |
| 12.13.14.15 | Cardholder |

Appendix 12 – Locations with outbound connectivity

List all subnets in General that can access the Internet. (This can be found from the General -> Internet flows.)

Appendix 13 – Outbound traffic from payment card applications

List all access from Cardholder Servers Folder to any trusted subnet, summarized to show source zone (usually Cardholder) and dest zone (often DMZ) plus the usual protocol/ports. Remove duplicate lines. For example:

| Source Zone | Dest Zone | Service |
|---|---|---|
| Cardholder | DMZ | tcp 80 http |
| Cardholder | Internet | tcp 80 http |

Sort this by Dest Zone (ascending), then Source Zone, then Service. When picking a zone name, use the most specific option from PCI – so, for example, if there is traffic from a given server to an Internet subnet, call this Internet, not Untrusted.

Appendix 14 – Externally accessible servers

List all servers found in DMZ, plus a column saying "RFC 1918" or "non RFC 1918"

Development specifications for assessing approvals against the as-built network model

OVERVIEW

DEFINE ZONES IN THE NETWORK

The user needs to be able to assign subnets or endpoints to zones in the network. The user will be able to change zone names, labels and positions to suit their own needs. For certain pre-defined zones, it is possible to assist the user by computing likely members of the zones. For example, the Untrusted part of a network will likely include any locations defined as "outside" or "untrust" or low security level in the firewall configurations. (Different firewalls define the lowest trust area in different ways, but any such configuration detail can be used as a hint here.) Once the Untrusted zone is known, a zone of type DMZ very likely includes all parts of the network that are reachable from the Untrusted area – given an analysis engine capable of showing all access paths, the likely DMZ candidates can be computed from the Untrusted areas. Likewise, if configuration data is available on endpoints, this can also provide likely candidates for high value assets – for example, endpoints known to be configured with database software are likely locations that need to be placed in a Protected zone. These and similar computations can be run to provide "suggestions" to the user when populating known zone types, such as the examples above.

Some example zones are described below; these particular definitions are appropriate for use when evaluating compliance with the Payment Card Industry (PCI) Data Security Standard (DSS), particularly Section 1. However, the ideas described here generalize to any other network access compliance context.

Untrusted

This zone will include all subnets defined to be untrusted. This will also contain the sub zones based on the Trust level. The Untrusted suggestions described earlier can assist users in selecting subnets to label in this way.

DMZ

Compliance environments like PCI DSS Section 1 generally have many requirements for flows to and from the "DMZ" – a zone separating the untrusted areas from the internal protected areas. As described earlier, it is possible to provide the user with a list of likely DMZ locations, given an analysis that can show all locations directly reachable from Untrusted zone.

Cardholder Data Evnironment (Critical Zone)

In the case of PCI DSS Section 1, the objective is to protect a defined zone where cardholder data is stored. In other compliance contexts, the precise definition and label will vary, but there is usually one or more target zones of this type. As described earlier, host configuration data can be used to identify candidate database servers, or the user can import externally maintained lists of endpoints or locations where protected data resides, and this can be used to populate this zone.

General Zone

Some customers have zones in their network that are not involved in communication with critical data. They can define this zone and the invention described here can show any communication between this zone and other zones.

Wireless Subnets

Many compliance rulesets, including PCI DSS Section 1, require that Wireless subnets be identified and have certain policies applied to them. Suggested wireless areas can be produced by analysis of network configurations, looking for any Wireless Access Points, or other evidence that wireless connectivity is available in a given subnet. Alternately, the user can manually enter the wireless locations.

Other Zones

The zones listed so far are sufficient for PCI DSS Section 1. They are also sufficient for many other compliance assessments (after some relabeling). However, the present invention is not restricted to using this set – the user may define fewer or more zones, and indicate which zone pairs are to be monitored for compliance.

IDENTIFY FLOWS BETWEEN ZONES

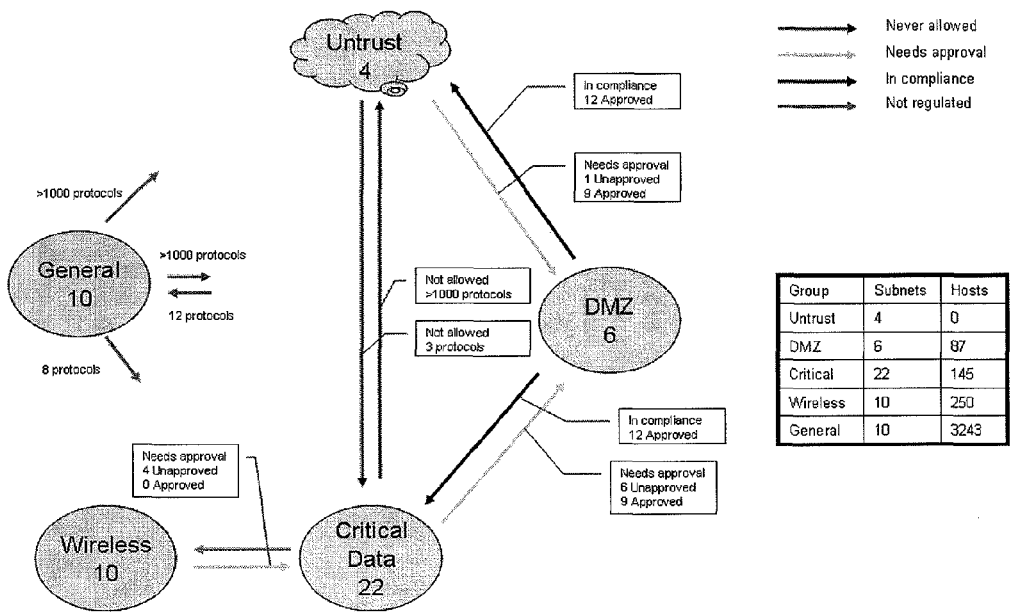

Figure 1

Figure 1 illustrates one possible layout for the data produced from the assessment calculation. Other diagrams are possible. (Note that for PCI DSS Section 1 compliance, the zone marked Critical Data can be labeled Cardholder Data – either label is adequate.)

Documenting Rules for Access

The invention requires the user to enter rules for access. There are a number of possible approaches to entry of this data.

The essential information is a combination of a business requirement (possibly documented with a record of the decision maker, the date, and an optional expiry or review time for the decision), plus a technical description of a given access (consisting at least of a zone pair, and possibly specific IP endpoints, and possibly restrictions to certain network protocols, and possibly restrictions to certain network ports). These combinations of decision details, plus access details, can be grouped, labeled, and edited as a group. (Edits should generate records in an audit log, indicating at least which user made what change at what time.)

Also, the access details need a qualifier to say whether the access is Approved or Forbidden. (In some instances, further types may be needed – see below.)

Given that a user will need to enter many such rules, some method will be required for reconciling rules which intersect, especially if they differ in their statement of whether the access is Approved or Forbidden.

One approach (familiar from firewall configuration) is to place all the rules in an order, and evaluate them exclusively in that order, so that the first rule which matches a given access is considered final. (Equally, the last rule could be used, or a similar scheme.)

Another approach is to treat one type of rule as superior to the other type – for example, that an access matching both an Approved statement and a Forbidden statement is always treated as Forbidden. In such a scheme, it can be useful to allow an override – for example, if Forbidden trumps Approved, it can be useful to add a third type, called Exception, which creates a type of Approval that overrides Forbidden. (This approach can be generalized, although 3 levels in this scheme is enough for some purposes.)

In this description of the invention, the approach using Approved, overridden by Forbidden, overridden by Exception, will be assumed. However, as noted, several other approaches can clearly be used.

Prohibited flows

Certain flows should never be allowed between zones and will be displayed as red arrows if ANY flow exists between prohibited zone combinations. For example, in PCI DSS Section 1, no flow is allowed in either direction between the Critical Zone and the Untrusted Zone. Such rules can be entered as a Documented Rule for Access, of type Forbidden, for all traffic between the given zone pair. (More detailed rules can also be written.)

Approve flows

Compliance with a networking standard requires that at least some access in the network require business justification to be considered compliant. For example, in PCI DSS Section 1, access between the Critical Zone and the DMZ or between the DMZ and the Untrusted Zone must be documented. Access between these zones can be displayed with arrows that indicate the number of approved and unapproved protocols (aka services; e.g. TCP/80). This information is very complex in real systems, so a summary should be presented initially, and then the user can drill down to the level of detail they need to justify the business uses of the flow.

An approval will consist of:
1. Creation date (or last edited date)
2. Logged in user
3. Approver name (from pick list to assist with consistency)
4. Access definition
    a. Source (Zone is required; any of IP address, range, subnet are optional)
    b. Destination (Zone is required; any of IP address, range, subnet are optional)
    c. Protocol (transport protocol (e.g. tcp, udp, icmp) and port range pair)
5. Description (the business justification for this flow)

A logged in user with admin or edit permissions will be able to:
1. Select an existing flow to approve
2. Edit an existing approval
3. Clone an existing approval
4. Delete an approval Flow summaries

Zone summary

There will be zero or one indications of access in each direction between any two zones.

Protocol summary

Each zone summary represents available access using one or more protocols (here we mean transport protocol/port combinations) between these zones. For example the arrow between the Untrusted Zone and the DMZ may represent access using 8 protocols.

Source and Destination per protocol

Each protocol summary represents one or more specific access protocols between a source and destination. Each source / destination can be a specific IP address, an IP range or a Zone. The user should be able to see all the specific access details that make up this summary.

FIND FIREWALLS BETWEEN ZONES

Some compliance rulesets, including PCI DSS Section 1, require proof that all access between certain zones be controlled by passing through Firewalls. The invention described here includes an algorithm that identifies those Firewalls and any access that can go between those Zones while avoiding a Firewall.

In some compliance rulesets, including PCI DSS Section 1, there are additional rules about zones. Specifically, some zones must be created to be exclusive of some other zones, while other zones are allowed to overlap. (One example from PCI DSS Section 1 is that the Wireless zone is allowed to overlap with other zones such as Untrusted, but the Cardholder zone cannot overlap with either the Untrusted or DMZ zones.)

As an illustration, the following list of zone properties shows rules appropriate for compliance with PCI DSS Section 1; the Exclusive keyword indicates which zones a given zone cannot overlap, and the FlowProhibited keyword indicates any other zone which is forbidden to allow access to the zone (and hence a rule of type Forbidden should be created for that zone pair). In a different compliance context, different exclusivity and forbidden access rules may apply.

Untrusted

Exclusive=[DMZ,Critical,General]
    FlowProhibited = [Critical]

DMZ

Exclusive=[Untrusted,Critical,General]
    FlowProhibited = []

Critical

Exclusive=[Untrusted,DMZ,Wireless,General]
    FlowProhibited = [Untrusted]

CriticalServers

Wireless

Exclusive=[Critical]

General

Exclusive=[Untrusted,DMZ,Critical]

ACCESS BETWEEN ZONES

Access between zones is calculated using a subroutine outside the scope of the current invention.

Zones will be comprised of subnets and/or endpoints. A subroutine call to show access between zones will be called. It will take as arguments a collection of source zones and a collection of destination zones. Only after it is verified that there are no subnet overlaps between the subnets in the source and destination zones, the aggregate traffic flow will be calculated.

This aggregate traffic flow can then be analyzed for several characteristics, including:
- Listing of the unique destination transport protocol range & port number range pairs (e.g. TCP/80); optionally resolve these into services (e.g. HTTP)
- Listing of the approved, unapproved, and forbidden flows Zones and Compliance To support tracking of approved and restricted flows, we will need to keep track of which zones should be analyzed for compliance.

Access Specification

Defining and testing against compliance rules require the concept of an access specification to be introduced. Each access specification acts as an explicit allowance or forbidding of the indicated access type between a source zone and a destination zone. The lack of any access specification covering any computed access between two zones acts as an implicit disallowance of said traffic.

Each access specification will be comprised of the following information:
- Source zone, with optional restrictions to a subnet list and/or an IP address range
- Destination zone, with optional restrictions to a subnet list and/or IP address range
- Destination transport protocols & port information pair (jointly called an AccessProtocol), which is comprised of:
    o Transport protocol range (e.g. "any" or tcp, udp, icmp, etc.)
    o Port number range
  Option: support selection of services for use in flow specifications by providing a list of known services gathered from SRM
- Access details
    o Short description
    o Access comments and justification
    o Type of rule – Approved, Forbidden, or Exception
    o Status:
        ▪ Active
        ▪ Inactive
    o Username of last editor
    o Expiration date (default is indefinite)
    o Creation date
    o Most recent edit date (any type of edit)

An Access Specification will be considered to be "in force" when it is marked "active" and the "approval expiration date" has not passed.

Traffic Flow Compliance with Access Specifications

The computed access between two Zones can be matched against the entire set of applicable Access Specifications and the results can be summarized as follows. After the access has been broken down into protocol descriptions (as previously described), there remains a list of found AccessProtocols. This list will then be processed against the Access Specifications in force and each found AccessProtocol will be marked accordingly with a AccessComplianceStatus:

- AccessComplianceStatus
    o Approved
    o Unapproved

- Forbidden
- Partial (a combination of Approved and Unapproved)
- Mixed (a combination of Forbidden and any other type)

If there are no "unapproved" or "forbidden" AccessProtocols then the access is deemed to be in compliance with the Access Specifications in force.

Access Details

Further details may be requested for any AccessProtocol line item. Given an AccessProtocol as a filter, we can compute and display a list of destination IP address ranges for which traffic could flow between the specified source and destination Zones.

A final level of detail can be requested which returns full details of the IP endpoints and protocols discovered between source and destination Zones for the specified AccessProtocol and IP address range.

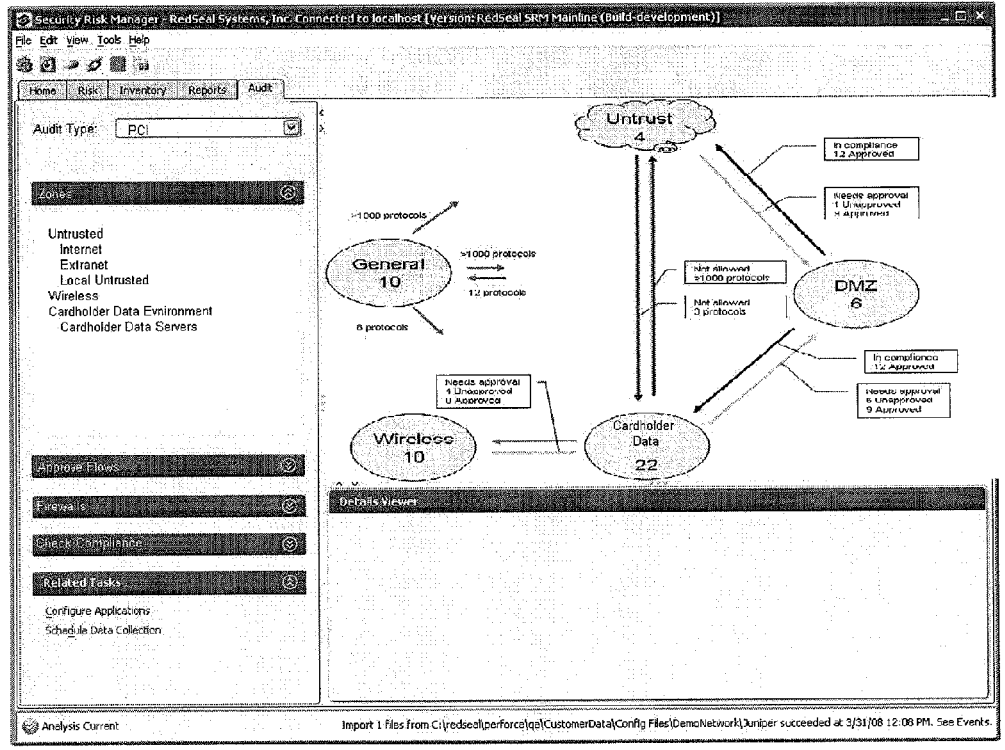

Figure 2

Define Zones

One special zone type that can be used is the "General Zone". All subnets that have not yet been added to a zone will live in the "General Zone", when it is used. (In some instantiations, fewer than all subnets may be candidates – for example, subnets with a /30 mask representing point to point connectivity, where both ends of the connectivity are in the known scope of the network, may be excluded.) The user may change the name of this Zone. The user will select subnets to populate the Zones using specific helpers for each zone.

COMPLIANCE SUMMARY GRAPHIC

It is helpful to the user to provide a visual summary of compliance status, and the access between zones, especially those discovered access options which are not yet documented, or are forbidden by some rule. One such summary is illustrated in Figure 1. (This diagram is shown using the zones associated with PCI DSS Section 1, but in a different compliance context, the diagram can be adjusted.) Analysis of the access possible between the zones should result in arrows between the zones. Each arrow will indicate the number of AccessProtocols that are approved and unaproved between those two zones. Existing access between pairs of zones that are prohibited to have access can be shown as red arrows.

What is claimed is:

1. A computer-implemented method, comprising:
duplicating, on a computing device, a pre-existing network environment by segmenting a pre-existing network into a plurality of defined zones, wherein a zone is defined by data elements and data associated with the data elements, and wherein interrelationships between zones are determined between two or more defined zones;
querying the pre-existing network for all packet access, wherein packet access includes inter-zone packet access;
summarizing inter-zone packet access;
generating an access dataset using the summarized inter-zone packet access, wherein summarizing includes generating a summary including a list of one or more protocol and destination port combinations found directionally between zone accesses;
receiving a policy set including a collection of approvals indicating whether a broad or narrow set of access is permissible;
computing the status of the pre-existing network by comparing the access dataset with the policy set; and
generating a compliance report using the computed status, wherein the compliance report is automatically re-generated and the status is automatically re-computed when a change to the pre-existing network environment is detected.

2. The method of claim 1, wherein duplicating the pre-existing network environment facilitates the execution of testing and analysis of the pre-existing network environment without disrupting the pre-existing network environment.

3. The method of claim 1, wherein the pre-existing network environment is in compliance with the policy set when the access data set is approved.

4. The method of claim 1, wherein the compliance report is a Payment Card Industry compliance report.

5. The method of claim 1, wherein the policy set includes a collection of negative rules.

6. The method of claim 1, wherein the policy set includes a collection of exclusive rules.

7. A computer-implemented system, comprising:
one or more processors;
one or more non-transitory computer-readable storage mediums containing instructions configured to cause the one or more processors to perform operations including:
duplicating a pre-existing network environment by segmenting a pre-existing network into a plurality of defined zones, wherein a zone is defined by data elements and data associated with the data elements, and wherein interrelationships between zones are determined between two or more defined zones;
querying the pre-existing network for all packet access, wherein packet access includes inter-zone packet access;
summarizing inter-zone packet access;
generating an access dataset using the summarized inter-zone packet access, wherein summarizing includes generating a summary including a list of one or more protocol and destination port combinations found directionally between zone accesses;
receiving a policy set including a collection of approvals indicating whether a broad or narrow set of access is permissible;
computing the status of the pre-existing network by comparing the access dataset with the policy set; and
generating a compliance report using the computed status, wherein the compliance report is automatically re-generated and the status is automatically re-computed when a change to the pre-existing network environment is detected.

8. The system of claim 7, wherein duplicating the pre-existing network environment facilitates the execution of testing and analysis of the pre-existing network environment without disrupting the pre-existing network environment.

9. The system of claim 7, wherein the pre-existing network environment is in compliance with the policy set when the access data set is approved.

10. The system of claim 7, wherein the compliance report is a Payment Card Industry compliance report.

11. The system of claim 7, wherein the policy set includes a collection of negative rules.

12. The system of claim 7, wherein the policy set includes a collection of exclusive rules.

13. A computer-program product, tangibly embodied in a machine-readable non-transitory storage medium, including instructions configured to cause a data processing apparatus to:
duplicate a pre-existing network environment by segmenting a pre-existing network into a plurality of defined zones, wherein a zone is defined by data elements and data associated with the data elements, and wherein interrelationships between zones are determined between two or more defined zones;
query the pre-existing network for all packet access, wherein packet access includes inter-zone packet access;
summarize inter-zone packet access;
generate an access dataset using the summarized inter-zone packet access, wherein summarizing includes generating a summary including a list of one or more protocol and destination port combinations found directionally between zone accesses;
receive a policy set including a collection of approvals indicating whether a broad or narrow set of access is permissible;
compute the status of the pre-existing network by comparing the access dataset with the policy set; and
generate a compliance report using the computed status, wherein the compliance report is automatically re-generated and the status is automatically re-computed when a change to the pre-existing network environment is detected.

14. The computer-program product of claim 13, wherein duplicating the pre-existing network environment facilitates the execution of testing and analysis of the pre-existing network environment without disrupting the pre-existing network environment.

15. The computer-program product of claim 13, wherein the pre-existing network environment is in compliance with the policy set when the access data set is approved.

16. The computer-program product of claim 13, wherein the compliance report is based upon external regulatory standards, guidelines, and procedures for the collection, transmittal, and storage of credit card information.

17. The computer-program product of claim 13, wherein the policy set includes a collection of negative rules.

18. The computer-program product of claim 13, wherein the policy set includes a collection of exclusive rules.

* * * * *